(No Model.) 4 Sheets—Sheet 1.
R. G. WARD.
MACHINE FOR SCRAPING THE PULP, &c., FROM FIBROUS PLANTS.
No. 404,756. Patented June 4, 1889.
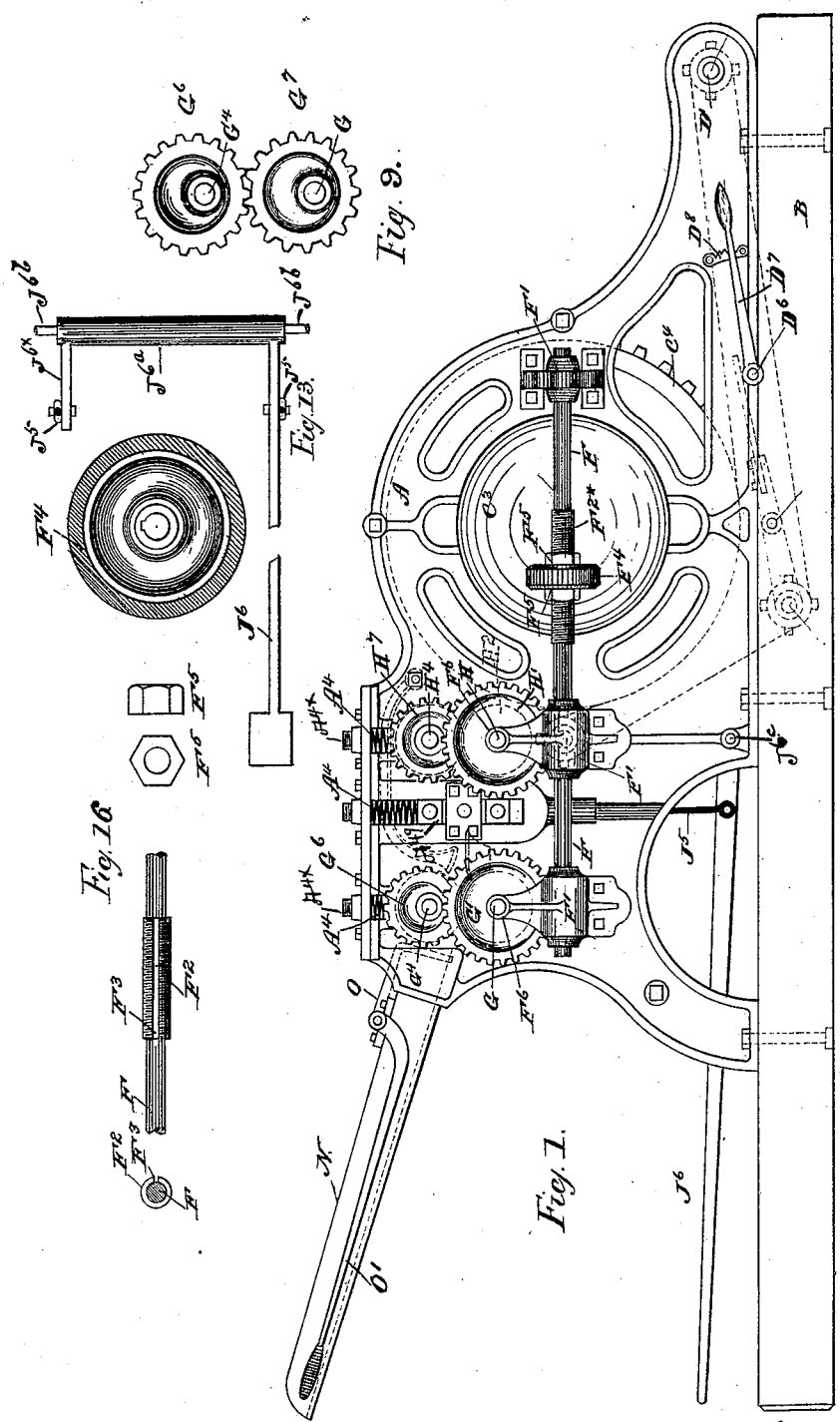
Witnesses:
L. C. Hills,
W. S. Duvall
Inventor:
R. G. Ward.
By E. B. Stoekling
Atty.

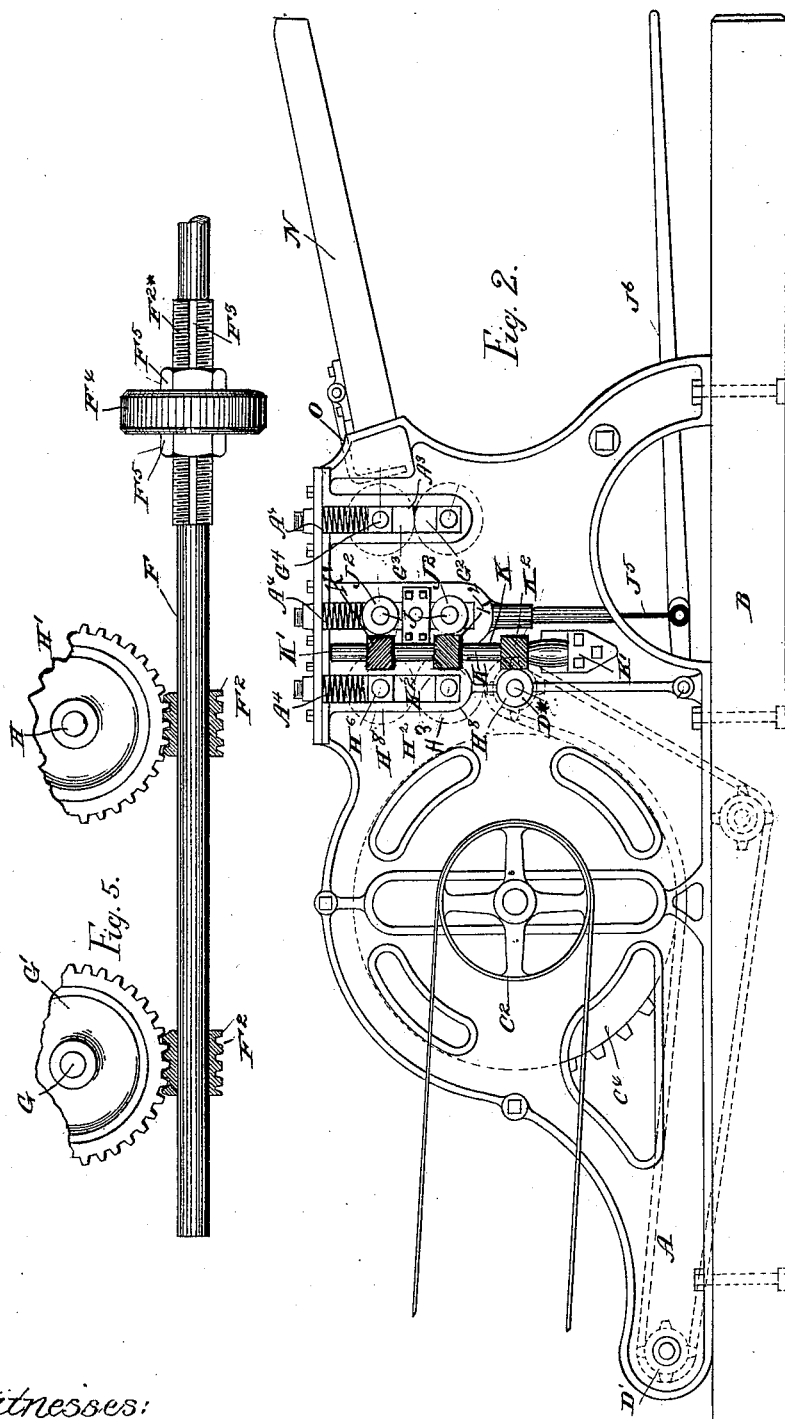

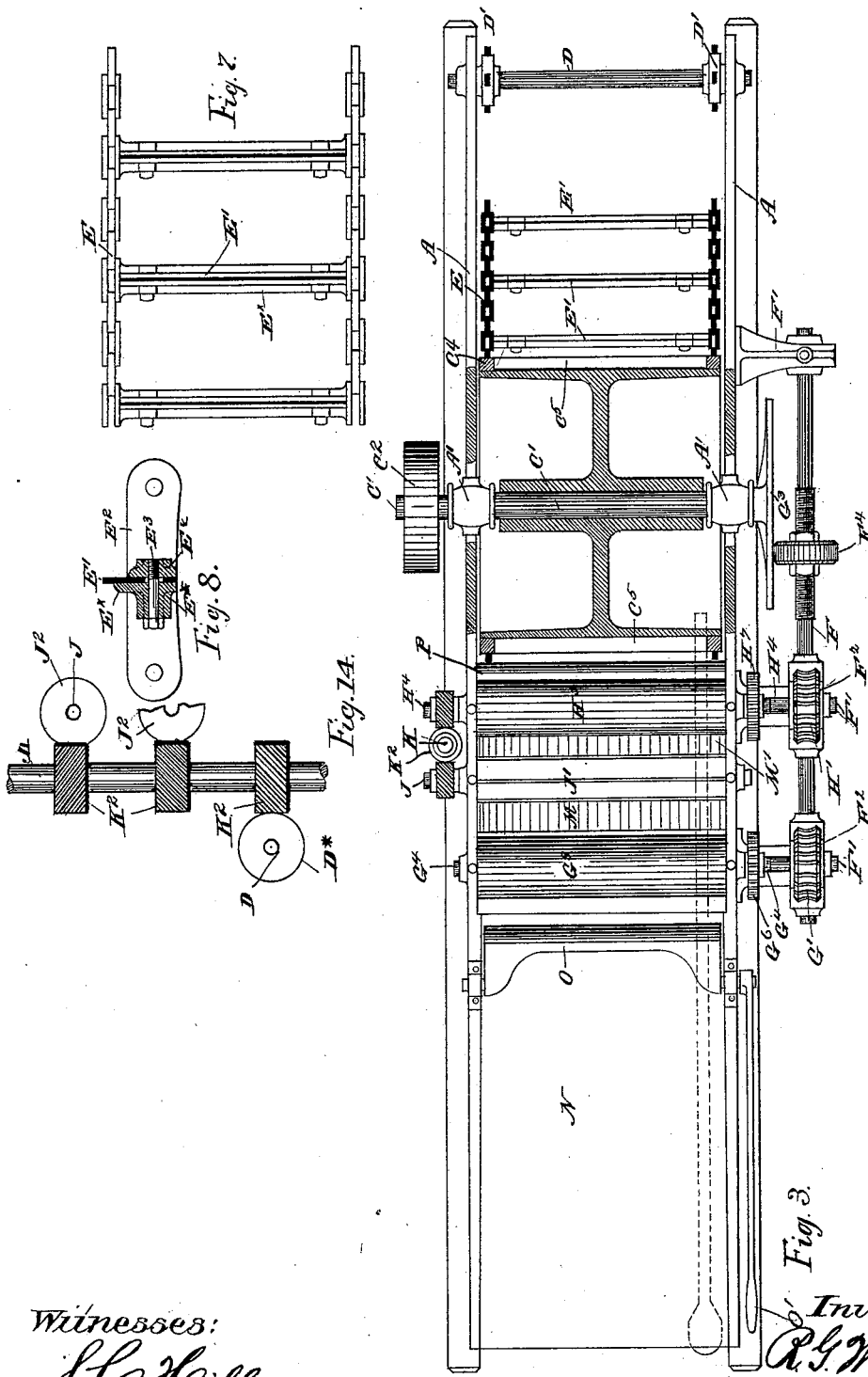

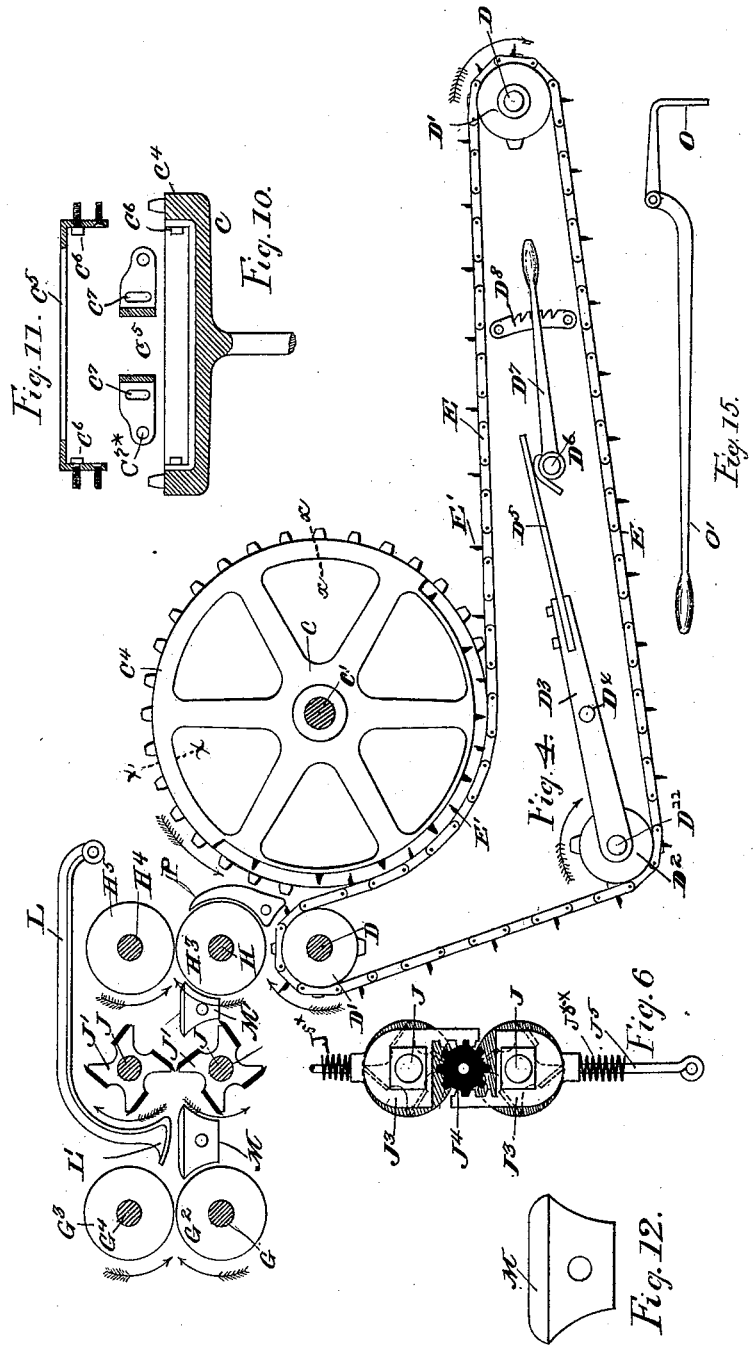

UNITED STATES PATENT OFFICE.

RANDOLPH G. WARD, OF BALTIMORE, MARYLAND.

MACHINE FOR SCRAPING THE PULP, &c., FROM FIBROUS PLANTS.

SPECIFICATION forming part of Letters Patent No. 404,756, dated June 4, 1889.

Application filed February 15, 1888. Serial No. 264,061. (No model.)

*To all whom it may concern:*

Be it known that I, RANDOLPH G. WARD, a citizen of the United States, residing at Baltimore, in the State of Maryland, have invented certain new and useful Improvements in Machines for Scraping the Pulp, &c., from Fibrous Plants, of which the following is a specification, reference being had therein to the accompanying drawings.

This invention relates to fiber-disintegrating machines for cleaning the fiber of leaves or stalks of plants, such as, for instance, sisal, hemp, maguey, agaves, jute, ramie, &c.; and among the objects in view are to provide a machine of the above class the operation of which shall be continuous, which shall be adjustable to plants and leaves of varying degrees of size and toughness, and which shall be capable of cleaning the entire length of plant or leaf without the necessity of reversing the same and without changing the motion of any of the mechanism of the machine.

Other advantages and objects of the invention will hereinafter appear, and the novel features thereof will be particularly pointed out in the claims.

Referring to the drawings, Figure 1 is a side elevation of a machine constructed in accordance with my invention. Fig. 2 is a similar view of the opposite side thereof. Fig. 3 is a plan, partly in section. Fig. 4 is a detail in side elevation showing the interior mechanism, the frame-work being removed. Fig. 5 is an enlarged detail, in side elevation, showing the mechanism employed for transmitting power to the feed-rolls. Fig. 6 is a detail in elevation showing the ends of the shafts upon which the scrapers are mounted and the means for simultaneously spreading the same. Fig. 7 is a detail in plan of a portion of the scraping-chain. Fig. 8 is an enlarged detail in section of one of the scrapers. Fig. 9 is a side elevation of the eccentric gears for driving the crushing-rolls. Fig. 10 shows details, partly in cross-section on the line $x\ x$ of Fig. 4, of the rim of the large scraping-wheel. Fig. 11 is a plan, partly in section, of the scraper employed on the wheel. Fig. 12 is an end elevation of cross-table employed between the lower rolls. Fig. 13 is a plan of the disintegrating-roll-operating lever. Fig. 14 is an enlarged view, in side elevation, of the power-transmitting shaft and connecting spiral gears for driving the disintegrating-rolls. Fig. 15 is a view in side elevation of the gate and its actuating-lever employed at the end of the feed-table. Fig. 16 shows details of elements employed upon the feed-roll power-conveying shaft, hereinafter referred to.

Like letters of reference indicate like parts in all the figures of the drawings.

A represents two opposite side frames of the machine, which may be of any desired form, and which are mounted upon and bolted to the sills or base B.

Journaled in suitable boxes A', adjusted to the frame-work A, is a cross-shaft C', provided with a pulley $C^2$ at one end, a disk $C^3$ at its opposite end, and an intermediate drum or cylinder C, the periphery of which at each end thereof is provided with a flange $C^4$, having sprockets extending therefrom.

Between the flanges $C^4$ of the cylinder, and extending across the peripheral face thereof, are ribs or scrapers $C^5$, which ribs, as clearly shown in Figs. 10 and 11, are adjustably held in place by means of bolts $C^6$, passing through slots $C^7$, formed in said scrapers. By this arrangement the scrapers may be adjusted so as to bring their scraping edges nearer to or farther from the periphery of the cylinder C, in accordance with the nature of the plant or leaf to be operated upon.

The adjustment of the scrapers to and from the cylinder is, by reason of their being pivotally connected with the cylinder by bolts passing through apertures $C^{7*}$, accomplished by swinging them on said pivots, so that they pass through a curved path. The scraper-chain E, being positively geared with the cylinder and having its regularly-spaced scrapers, has the same surface speed as the cylinder; but in the above-mentioned adjustment of a scraper to a position farther from the periphery of the cylinder it travels faster, being farther from the center of motion, and is brought nearer to an adjacent scraper on the chain E. A scraper so adjusted presses harder on the material and travels faster than the co-operative scraper mounted on the chain, whereby the scraping action is increased. The vertical adjustability of the scrapers E' (see Fig. 8) gives further effect in the same direction.

At the rear end of the frame-work, and journaled therein, is a shaft D, having at each end thereof a sprocket-wheel D'. A similar shaft D, with sprocket-wheels D', is arranged in front of the scraping-cylinder C, and over these two sets of sprocket-wheels, and meshing with the sprockets upon the flanges $C^4$ of the cylinder, are sprocket-chains E, the tension of which is regulated by means of sprocket-wheels $D^2$, mounted on a shaft $D^{22}$ at the end of a lever $D^3$, fulcrumed as at $D^4$, and having a spring-plate $D^5$ extending from its opposite end and bearing upon an eccentric shaft $D^6$, having a hand-lever $D^7$ extending therefrom and capable of engaging with a rack-bar $D^8$, whereby the desired amount of tension may be regulated and retained by swinging said lever $D^7$ vertically and throwing the same into engagement with said rack-bar $D^8$, all as clearly shown in Fig. 4. Said lever $D^3$ is attached to the axle of the forward sprocket-wheels $D^2$ at its center of gravity, and therefore one lever suffices for both wheels on said axle, although two levers may be used, if desired, without departing from the spirit of my invention.

Referring more particularly to Figs. 1 and 5, F represents a horizonal shaft mounted in suitable boxes F' at the side of the frame-work and provided with worm-gears $F^2$. The shaft F is formed with a threaded portion $F^{2*}$, having a longitudinal groove or keyway $F^3$, and upon said thread and keyed within the groove $F^3$ thereof is an adjustable friction-pulley $F^4$, held in place by means of set-nuts $F^5$, (see Fig. 17,) said pulley having frictional contact with the disk $C^3$, mounted upon the shaft C'. By this manner of mounting the pulley $F^4$ upon the shaft F it is evident that said pulley may be moved along and made rigid upon the shaft, so as to bring its contact-point farther from or nearer to the center of the disk $C^3$, thus diminishing or increasing the rotation of the shaft F and the feed-rolls or other mechanism connected therewith and revolved thereby.

The boxes F', which also inclose the worms $F^2$ and form bearings for the shaft F, are upwardly extended, and have formed therein bearings $F^6$ for the shafts G and H, respectively, said shafts being in the same plane and provided at their ends with worm-gears G' H', which mesh with and are driven by the worms $F^2$ of the shaft F.

Upon the shaft G is mounted a crushing-roll $G^2$, and above the same is a companion crushing-roll $G^3$. The rolls $G^2$ $G^3$, as well as the rolls $H^3$ $H^5$, hereinafter described, perform in addition to the function of crushing that of feeding the material, and therefore may properly be designated either as "feeding-rolls" or as "feeding and crushing rolls." The peripheries of these rolls work constantly in contact with each other, the shafts of the same being journaled in vertical slots $A^3$, formed in the sides of the frame-work A, the shaft $G^4$ of the roll $G^3$ being yieldingly held against upward movement by means of springs $A^4$, pressing upon the boxes in which the shaft of the roll is journaled.

Upon the shafts $G^4$ and G are mounted eccentric gears $G^6$ $G^7$, so that as the lower crushing-roll $G^2$ is driven in one direction its upper companion $G^3$ is driven in an opposite direction. By this eccentrical connection of the two shafts the rolls thereon are driven at relatively variable rates of peripheral speed, which impart a combined rasping and crushing motion when acting upon fibrous substances which may be fed between them.

Upon the shaft H is mounted a gear H', which, as before stated, meshes with the worm $F^2$ of the shaft F. The shaft H also carries a second gear $H^2$, as shown by the dotted circle, Fig. 1, and an elastic pressure-roll $H^3$. A companion and similar roll and shaft $H^5$ $H^4$ is mounted above the roll $H^3$, and held in contact therewith by box $H^6$, pressed downward by springs $A^4$, and receives rotation from the gear $H^2$ through the medium of a similar gear $H^7$, mounted on the shaft $H^4$, Fig. 1. Between the crushing-rolls $G^2$ and $G^3$ and pressure-rolls $H^3$ and $H^5$, Fig. 4, and journaled in the reciprocating spring-pressed boxes $A^{49}$, are shafts J, carrying longitudinal blades, scrapers, or cutters J'. The outer ends of the shafts J are provided with spiral gears $J^2$. (See Figs. 2 and 14.)

A vertical shaft K, journaled in bearings K', is provided with spiral gears $K^2$, which mesh with the spiral gears $J^2$, making two pairs—a right and a left—which impart the opposite motions indicated to the disintegrating-rolls J'. Mounted upon the front shaft D is a worm-wheel $D^*$, (see Fig. 2,) which meshes with and imparts motion to the shaft K through the medium of the lower one of the series of worm-wheels $K^2$ of the shaft K.

Referring more particularly to Fig. 6, each of the rolls or shafts J is provided within its journals or near the same with oppositely-arranged rack-bars $J^3$, which mesh with an intermediate pinion $J^4$, mounted on the frame for rotation between the two shafts. By this arrangement it will be seen that the weight of the upper of the two shafts J will cause the same to descend and turn the pinion $J^4$, which will consequently raise the lower shaft and hold the same in a suspended position. The faces of the worms $K^2$ are larger than the gears $J^2$, so that the upward and downward movement of the two shafts is permissible. It is also evident that in order to increase the tension with which these rolls act upon the fibrous substances it is only necessary to tighten the springs $A^4$, arranged in the slots for the boxes $A^{49}$, by means of the screws $A^{4\times}$. The rod $J^5$ depends from the lower of the journaled rack-plates $J^3$ on each side of the machine, and is connected at its lower end to a foot-lever $J^6$, projecting out from the machine. By pressing upon this lever the lower journal and roll will be caused to descend, the pinion $J^4$ turning, and the upper of the pair of rolls caused to simultaneously ascend.

Coiled springs $J^{5x}$ may be arranged one upon each of the upper rack-plates $J^3$, so as to yieldingly press the upper roller $J'$ toward the lower one, and similar springs may be arranged on the rods $J^5$ to yieldingly press the lower roller $J'$ toward the upper one. The upper and lower ends of the upper and lower springs, respectively, would, when employed, abut against some fixed part of the framework. In Fig. 13 the lever $J^6$ and the rock-shaft $J^{6a}$, to which the lever is attached, are shown in plan. A short rock-arm $J^{6x}$ projects from the shaft and serves the purpose of giving motion to a companion or duplicate rod $J^5$ by being connected to it. The rock-shaft $J^6$ is provided with journals $J^{6b}$, which are mounted in bearings $J^{6c}$ in the frame of the machine. (See Fig. 1.)

As shown in Fig. 4, a pivoted guard L is provided, which covers the cutting-rolls $J'$ and the pressure-rolls $H^3$ $H^5$, and which has a forward and downwardly projecting portion $L'$, which serves as a yielding guiding mouth through which are fed the leaves or other material to be operated upon.

A table M is rigidly mounted below the lip L and between the crushing-rolls and cutter-rolls. A similar table $M'$ is arranged between the pressure-rolls $H^3$ $H^5$ and the cutters $J'$. These tables, in connection with the guard L, prevent undesired scattering of the pulp and serve to sustain the fiber while passing through the rolls J when open to admit the same.

At the forward end of the machine is provided a feed-table or chute N, upon which the fibrous plants or leaves are passed into the machine.

A gate O is journaled in the sides of the table N, and is provided with an opening and closing lever $O'$, which serves to regulate the amount of leaves fed to the machine, and to present them squarely to the feeding mechanism.

As shown in Figs. 7 and 8, the sprocket-chains E (in this instance at every second alternate link) are provided with a connecting-rib $E^x$, which may act as or support a scraper $E'$, which is operated in conjunction with the scrapers on the cylinder C. These scrapers $E'$ are held rigidly in position between the rib $E^x$ and clamping-plate $E^4$, said rib-plate and scrapers being perforated at intervals and secured together by bolts $E^3$. The plates or ribs $E^x$ are formed with perforated ears $E^2$, by which the scrapers and plates are riveted to the chains. If desired, however, the ribs may be formed as a part of the links of the chains. (See Fig. 7.) The perforations in the scrapers are larger than the body of the bolt $E^3$, so that they, like their companions on the cylinder, may be adjusted.

The operation of the machine is as follows: The leaves or plants are placed in the chute N, headed against the gate O, and the lever $O'$ is depressed, whereupon the gate is raised and permits the leaves or plants to pass to the crushing-rolls $G^2$ $G^3$. The foot is simultaneously placed upon the lever $J^6$, by the depression of which the scraping-rolls or cutters $J'$ are caused to separate and the leaves pass therethrough unscraped until they become engaged by the holding-rolls $H^3$ $H^5$. The foot is then removed, and the rolls $J'$ $J'$ begin and continue to act in a direction opposite to the movement of the approaching leaf until said leaf has passed entirely through. That portion of the leaf which is untouched, as well as the whole of the fiber, then passes between the holding-rolls $H^3$ $H^5$, over the guard-plate P, and between the scrapers $C^5$ upon the periphery of the wheel C, and the scrapers $E'$ on the chains E and out over the shaft D at the rear end of the machine. As soon as the last ends of the first course of leaves have passed the crushing-rolls the process may be repeated, and so on continuously. By means of the adjustable devices described the scrapers upon the cylinder C and upon the chains E may be made to bear with greater or less force upon the fibrous substances, as desired. The guard L directs the upwardly-scattered pulp downwardly upon the endless chain and between it and the cylinder.

By reference to Fig. 6 it will be seen that the movable frame $J^3$, provided with the rack-bar, is supported yieldingly against downward motion by means of coiled springs arranged upon the rods $J^5$, whereby the lower roll J is kept normally pressed against the upper one.

Having described my invention and its operation, what I claim is—

1. The combination of feed-rolls, scrapers, means for rotating said scrapers in a direction opposite to that in which material is fed to the same, feeding and holding rolls arranged beyond the scrapers in the line of feed, and rotating in a direction opposite to that of the scrapers, and scraping mechanism arranged beyond the feeding and holding rolls, substantially as specified.

2. Feeding-rolls, in combination with eccentrically-mounted gears connected with the rolls for operating the same.

3. Feeding-rolls, in combination with eccentrically-mounted gears connected with the rolls, and means for operating said gears, substantially as specified.

4. Rotary scrapers or cutters, means for rotating the said scrapers to scrape the material in a direction opposite to its travel in the machine and feeding and holding rolls, in combination with mechanism, substantially as described, for separating said scrapers at will, substantially as specified.

5. Feed-rolls having relatively variable surface speeds, in combination with rotary scrapers, and gearing, substantially as described, attached to said feed-rolls and scrapers for rotating the same in opposite directions.

6. Feed-rolls, eccentric gears operatively connected therewith, and mechanism, substantially as described, for driving said gears, in combination with rotary scrapers and gearing for driving said scrapers in a direction opposite to that of the travel of the material upon which they operate, and feeding and holding rolls, substantially as specified.

7. The combination of feeding-rolls, eccentric gearing attached to the same, as described, rotary scrapers, gearing to rotate the same in a direction opposite to that of the passage of the material, rolls arranged in advance of the scrapers in the direction of the movement of the material, scraping mechanism arranged in advance of said feeding and holding rolls, and mechanism for actuating the holding-rolls and the gearing of the feed-rolls, substantially as described.

8. Rotary scrapers or cutters, in combination with gearing for rotating the same continuously in a direction opposite to that of the material passing therebetween, feeding and crushing rolls arranged in advance of the cutters, holding-rolls arranged beyond said cutters, and a pivoted guard arranged over the cutters or scrapers and resting upon the material in advance of the cutters, substantially as described.

9. The scraping rolls or cutters J', working continuously in the direction specified, and provided with movable rack-bearings J$^3$, in combination with the pinion J$^4$, springs J$^{5\times}$, rods J$^5$, lever J$^6$, and means for actuating said scraping rolls or cutters, substantially as specified.

10. The combination of the scraping-cylinder C, the scraping-chain E, the tightener D$^2$ D$^3$, the eccentric shaft D$^6$, the lever D$^7$, and the lever-holding device, substantially as described.

11. The combination, with the cylinder C, of the scraper C$^5$, slotted, as at C$^7$, and pivoted, as at C$^{7*}$, and with scraper-adjusting bolts C$^6$, substantially as specified.

12. The combination, with feeding and scraping rolls, means for operating the same, and the scraping-cylinder and scraping-chain, of intermediate gearing, and means, substantially as described, for adjusting the same, whereby the desired speed of motion is communicated from the cylinder to the gearing which operates said scraping-rolls and said feeding-rolls, substantially as specified.

13. Feeding-rolls and a system of gearing for driving the same, comprising a shaft and driving-pulley, and means for adjusting said pulley, in combination with a positively-driven shaft bearing a disk C$^3$, arranged adjacent to said adjustable pulley, whereby varied speeds with relation to that of the positively-operating shaft may be given to the feed-rolls, substantially as specified.

14. The combination of the disk C$^3$, the pulley F$^4$, nuts F$^5$, and the threaded and slotted shaft F, substantially as specified.

15. The guard L L', tables M M', the cutters J', feed-rolls H$^3$ H$^5$, rolls G$^2$ G$^3$, and the guard-piece, substantially as and for the purpose specified.

16. Separable scraping or cutting rolls, as J', the vertical shaft K, having wide-faced spiral gears K$^2$, intermeshing gears mounted on the cutter-shafts, and means, substantially as described, for effecting the separation of the scraping-rolls.

17. The combination of the spiral gears K$^2$, the shaft K, the gears J$^2$, and cutter-shafts J, substantially as specified.

In testimony whereof I affix my signature in presence of two witnesses.

R. G. WARD.

Witnesses:
APPLETON P. CLARK,
HEATH SUTHERLAND.